INVENTOR
R. R. STOKES
BY
ATTORNEY

REMOTE TEST ARRANGEMENT FOR COIN TELEPHONES

Filed June 28, 1967

3 Sheets-Sheet 2

Feb. 17, 1970 R. R. STOKES 3,496,300

REMOTE TEST ARRANGEMENT FOR COIN TELEPHONES

Filed June 28, 1967 3 Sheets-Sheet 3

United States Patent Office 3,496,300
Patented Feb. 17, 1970

3,496,300
REMOTE TEST ARRANGEMENT FOR COIN TELEPHONES

Rembert R. Stokes, Middletown, N.J., assignor to Bell Telephone Laboratories, Incorporated, Murray Hill, N.J., a corporation of New York Filed June 28, 1967, Ser. No. 649,702
Int. Cl. H04m 17/02
U.S. Cl. 179—6.3 14 Claims

ABSTRACT OF THE DISCLOSURE

A tuned reed relay is added to the logic circuit of a conventional coin telephone and the contacts of the relay are uniquely combined in circuit relation with the coin chute, the coin relay and the totalizer mechanism. The particular circuit paths established by remote tone operation of the relay from the central office provide an indication of the operability of various portions of the coin telephone set and accordingly remote testing of specific functions of the set is made possible.

BACKGROUND OF THE INVENTION

Field of the invention

This invention relates to coin operated telephones and more particularly to coin telephones including means that provide for remote checking of the set to determine whether it is functional.

Description of the prior art

It is well known that a malfunctioning coin telephone, or even a coin telephone that is completely inoperable, may remain in that condition for an extended period of time simply because no one bothers to report its condition to the operating telephone company. This condition is highly undesirable from a business standpoint not only because of the direct loss of revenue but also because of the customer dissatisfaction and inconvenience that results. Another frustrating aspect of the problem is the fact that of all of the coin telephones that are reported by customers to be out of order or otherwise requiring service, approximately one half of that number are found to be in proper working order when the repairman arrives on the scene. The solution to the problem obviously does not lie in the direction of more frequent service visits by repairmen. Whatever gains that might be made in increased revenue would be more than offset by the increased cost of the service checks.

Accordingly, the general object of the invention is to facilitate low cost operability testing of coin telephones.

SUMMARY OF THE INVENTION

The stated object and related objects are achieved in accordance with the principles of the invention by a coin telephone equipped with a remotely operable test arrangement that permits various functions of the set to be tested from the central office or other remote checking point. The need for increased signaling capacity is met by the use of a tuned reed relay which includes a plurality of contacts each operably responsive to the receipt of an interrogating signal of a respective frequency.

In accordance with the invention each of the contacts of the tuned reed relay is uniquely combined with a particular portion or subassembly of the coin telephone set such as the coin chute, the coin relay and the totalizer. Thus, upon the operation of a particular one of the tuned reed relay contacts in response to a suitable interrogating signal from a remote point such as the central office, a corresponding circuit path is either completed or opened depending upon the operability of the associated mechanism. The condition of that circuit path, i.e., either opened or grounded, for example, is detectable from the central office and hence it is possible to determine remotely which portions or mechanisms of the coin telephone are functional and which are inoperable. If the test indicates no malfunction, essentially no cost has been incurred by the check; on the other hand, if the test does indicate trouble, a repairman can be dispatched with the assurance that the tested station does indeed require repair service.

Figure 1:
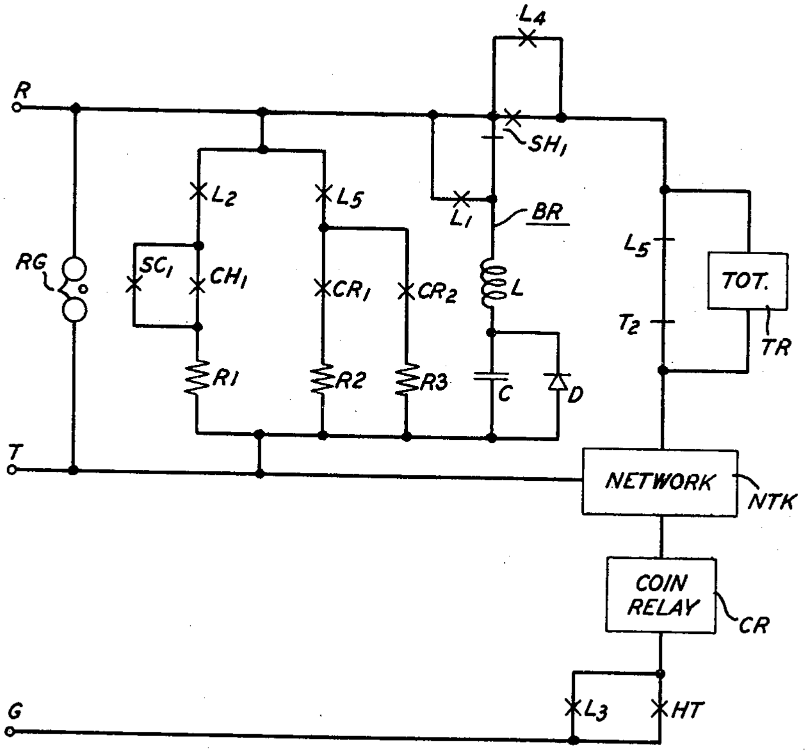
FIG. 1 is a schematic circuit diagram of a portion of a coin telephone logic circuit in accordance with the invention.

The conventional portions of the coin telephone logic or control circuit shown in FIG. 1 have been largely omitted to ensure clarity in the disclosure of those portions of the circuit which embody the features of the invention. The latter portions of the circuit are shown in heavy lines. The essence of a check circuit system in accordance with the invention lies in the use of a tuned reed relay L which is a part of a bridge circuit BR connected across the tip and ring T–R leads on the loop side of the conventional switch hook make contact $SH_1$. The bridge circuit BR also includes a break switch hook contact $SH_1$ and a parallel combination of a capacitor C and a diode D. The impedance of the bridge circuit BR is selected to avoid loading the ringer RG. Whenever the handset (not shown) is off-hook, the bridge circuit BR is opened by break contact $SH_1$ and the relay L is thus removed from the path of normal signaling. When the telephone is in the idle on-hook condition, however, the bridge BR is fully connected and the set is ready to be tested by a check routine initiated at the central office or other remote control point.

Switches L1 through L5 are resonant reed switches operated by the relay L. Relays of this general type are well known in the art, being shown for example by C. E. Germanton et al. in U.S. Patent 2,821,597, issued Jan. 28, 1958, and by L. Armitage in U.S. Patent 2,694,119, issued Nov. 9, 1954. Such relays typically include a number of tuned reeds mounted around a single coil. When an excitation signal with a frequency close to the resonant frequency of one of the tuned reeds is applied to the coil, the resonant reed vibrates with increasing amplitude until it contacts one of the pole pieces in the armature gap. Because the pole is a permanent magnet, the reed is attracted to the pole piece and remains latched after the alternating current excitation is removed. Each of the reed switches L1 through L5 is employed in accordance with the invention to provide a contact pair which permits completing a respective one of a plurality of check circuits which remains closed or operated until a direct current pulse is passed through the coil in a direction that developes a magnetic field in opposition to the field of the permanent magnet pole piece, which allows the tuned reed to drop. The relay L is then ready to be excited with a signal of a different frequency which achieves the locking up of a different contact, thus establishing another check circuit.

Figure 2:
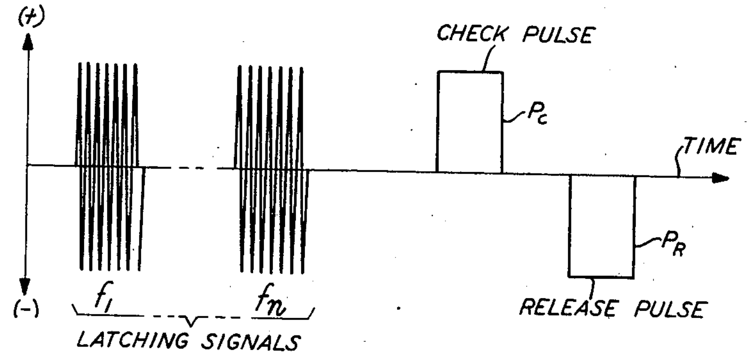
FIG. 2 is a plot of control signal forms employed in accordance with the invention.

The general method of operating the check circuits and the central office signaling required to interrogate a function are illustrated in part by FIG. 2. To initiate a test sequence, a primary control signal of frequency $f_1$ is transmitted to the station on the idle talking pair. In the manner described above, this signal causes the $L_1$ resonant reed switch to latch closed in parallel with the closed switch hook break contact $SH_1$. Should the handset go off-hook and open the break contact $SH_1$, the closed relay contact $L_1$, the relay coil L and the diode D provide a path for line battery current which releases any of the reed switches that is latched. Next, one or more of the remaining reed switch actuating frequencies $f_1 \ldots f_n$ are serially transmitted from the central office, depending upon the particular function being interrogated.

Once the proper combination of reed switches has been latched up, a positive potential direct current check signal, such as check pulse $P_C$ shown in FIG. 2, is transmitted on the ring lead R. The relay L is not released by the check signal $P_C$ owing to the presence of the blocking diode D and the capacitor C. The latched switches thus remain closed, permitting the checking of the detector circuit associated with the specific apparatus under surveillance. If a particular detector switch is closed, current is permitted to flow through a limiting resistor, such as resistor R1, R2 or R3 for example, which current can be detected and interpreted in the central office. After the circuit check has been made, a direct current disconnect signal, such as the pulse $P_R$ shown in FIG. 2, opposite in polarity to the check pulse $P_C$, is applied to the line from the central office or other control point to release the latched switches. The monitoring control at the central office then proceeds to test the next function.

In accordance with the invention the customer is fully protected from any possible interference from the test circuits during normal telephone use. For example, it is impossible to start a checking sequence if the telephone is in use, inasmuch as the break contact $SH_1$ of the switch hook is open. Moreover, should a customer initiate a call during a checking sequence, the application of line battery drops the L relay and the latched switches directly, as described.

Figure 3:
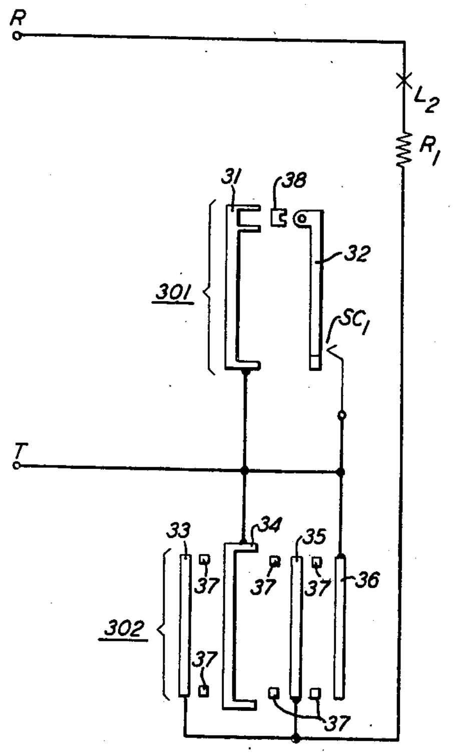
FIG. 3 is a sketch of a coin chute sensor in accordance with the invention.

Operation in the check mode involving a test of the coin chute is illustrated by the combination of FIGS. 1 and 3. FIG. 3 is a sketch in abbreviated or diagrammatic form showing the principal elements of a conventional coin chute which includes an upper portion 301 having a master plate 31 and a swing plate assembly 32 together with a lower portion 302 which includes a nickel cover plate 33, a lower master plate 34, a quarter plate 35 and a quarter cover plate 36. Such coin chutes are well known in the art, being shown for example by J. L. Peterson in U.S. Patent 3,169,625, issued Feb. 16, 1965.

The principal cause of malfunction in coin chutes is the jamming of coins or foreign materials in the coin channels between the various plates. Additionally, in some types of coin chutes, such as that shown for example in the patent cited above, the apparatus is rendered inoperative if the coin clear-out mechanism associated with the swing plate assembly 32 sticks in the open position. A fully adequate chute sensor arrangement must detect either of the two indicated types of malfunctioning. This need is met in accordance with the invention by the arrangement shown in FIG. 3. As indicated, the chute is constructed of a number of adjacent plates and, in accordance with the invention, these plates are insulated from each other so that they can maintain different levels of electrical potential. Consider first the upper half of the chute 301; if a ground level potential were connected to the master plate 31 and a signal above ground were applied to the swing plate assembly 32, any conducting material stuck in the chute would bridge the two otherwise insulated plates to complete a signal path between them. As shown, the two plate members 31 and 32 are normally kept electrically isolated in accordance with the invention by an insulator 38. In order to provide for detecting those malfunctions caused by nonconducting slugs or other nonconducting foreign objects that may jam the chute in the open position without establishing a conductive path between the plates, a separate chute contact $SC_1$ is placed on the outside of the swing plate assembly 32 so that the switch is closed whenever the swing plate 32 is open. As shown, the switch $SC_1$ is connected to the master plate 31 and hence is at the same potential. Thus, if paper or other nonconducting foreign material is driven in to open the plate assembly of the upper chute 301, or if a faulty coin return mechanism leaves the plate assembly open, a detectable conducting path between the plates 31 and 32 is completed by the switch $SC_1$.

With respect to the lower half of the chute 302, the plates 33, 34, 35 and 36 are insulated from each other in accordance with the invention by the insulators 37—37. Alternate plates may thus be held at one potential and alternate adjacent plates at a second potential. Any conductive slug or coin jammed between a pair of plates thus completes a detectable signal path. During normal operation the entire chute is electrically at ground potential, inasmuch as the master plates 31 and 34 (lower portion) are grounded and the reed switch L2 is open. As a result, the chute is maintained in a safe condition for handling and, additionally, protection is afforded against the possible stimulation of corrosion by jammed coins.

In order to check the chute from the central office, signals of frequency $f_1$ and $f_2$ are serially applied to latch switches L1 and L2 respectively. When the chute is inoperative, the application of a check signal causes a direct current to flow from the ring lead R through the chute, represented in FIG. 1 by the closed make contact $CH_1$, and through resistor R1 to the tip lead T. This current flow is, of course, detectable at the central office. When the chute is operative, no current will flow owing to the fact that make contact $CH_1$ and make contact $SC_1$ are open, or, stated otherwise, there is no conducting path between adjacent plates.

Figure 4:
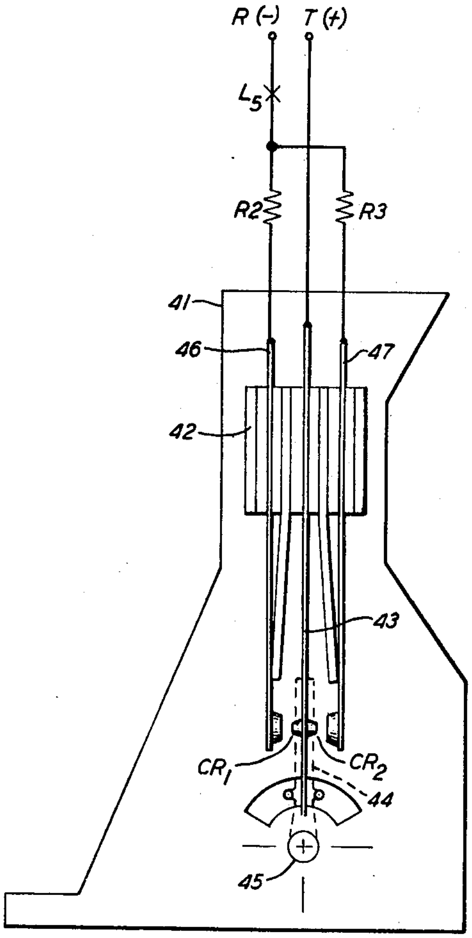
FIG. 4 is a coin relay collect and refund sensor in accordance with the invention.

Another potential source of coin telephone malfunctioning is the coin relay. The combination of a coin relay, a coin deflecting vane and a coin hopper is well known in the art, being shown for example by F. A. Hoyt in U.S. Patent 2,204,083, issued June 11, 1940. Such a combination in diagrammatic sketch form modified to include a sensor in accordance with the invention is shown in FIG. 4. A spring pile-up 42 which includes conductive spring members 43, 46 and 47 is mounted on a coin hopper 41. Each of the spring members 46 and 47 is connected to the ring lead R by way of the tuned reed switch $L_5$ and by way of a respective one of the resistors R2, R3. The conventional coin deflecting vane 44 pivoted on pin 45 is modified as shown so that as it swings it also deflects the center spring member 43, thus closing either the collect contacts $CR_1$ or the refund contacts $CR_2$. The vane 44 is operated in conventional fashion by the coin relay CR, FIG. 1, being pivoted to the coin-collect side in response to a "collect" signal to the coin relay and to the coin-refund side in response to a "refund" signal to the coin relay. It is thus evident that monitoring the condition of the switches $CR_1$ and $CR_2$ following the transmission of an operating pulse to the coin relay CR, provides an accurate check on the operability of the coin relay.

To perform a coin relay check in accordance with the invention, a control routine is required that is somewhat more complex than that used for the testing of the coin chute. After a first signal of frequency $f_1$ latches the control switch $L_1$, a signal of frequency $f_3$ is employed to latch the switch $L_3$ in order to bypass the hopper trigger contact HT. A signal of frequency $f_5$ is then transmitted to latch contacts $L_5$ which enables the check circuit. With the check signal applied between the tip and ring leads T and R, the coin relay CR is operated with a collect pulse between the tip lead T and ground G. Collect operation of the coin relay CR closes the collect switch CR1 in the manner described above, permitting current to flow through resistor R2. Similarly, with the same check signal between the tip and ring leads T and R, operation of the coin relay CR with a refund pulse from tip lead T to ground G closes the refund check switch CR2, permitting current to flow through resistor R3. By selecting the proper resistance magnitudes for resistors R2 and R3, it is possible to distinguish between the two modes of operation. Release of the coin relay check circuit is achieved by applying a disconnect or release pulse $P_R$.

The coin totalizer is another mechanism in a coin telephone set which may occasionally become inoperable as the result of vandalism or malfunction. As the name implies, a coin telephone totalizer keeps track of the coins deposited. The totalizer also initiates the transmission of appropriate signals to the controlling operator upon the deposit of each coin. A mechanism of this type is shown by E. R. Andregg et al. in U.S. Patent 3,146,312, issued Aug 25, 1964. Under normal operation the deposit of coins opens the totalizer break contact $T_2$ thus removing a short circuit which permits the totalizer TR to be supplied with power, The totalizer TR operates in step fashion, opening and closing a power supply path to a coin signal oscillator, until it returns to a home position. At that point the contacts $T_2$ close, disabling the totalizer until subsequent coins are deposited.

To adapt a conventional totalizer for checking in accordance with the invention, it is only necessary to provide normally closed tuned reed contacts $L_5$ in series with the totalizer contacts $T_2$. This addition requires no change in conventional totalizer design.

To monitor the totalizer TR from the central office with the check circuit shown in FIG. 1, the tuned reed switch $L_1$ is first closed by applying a signal of frequency $f_1$. A signal frequency $f_4$ is employed to latch contacts $L_4$ which bypasses the switch hook make contact $SH_1$. Next, the application of an oscillatory signal burst with frequency $f_5$ operates break contact $L_5$, making the totalizer TR ready for readout. Finally, latching make contact $L_3$ of relay L by the application of a signal of frequency $f_3$ permits power to be applied between the ring and lead R and ground G without releasing the L relay. When the totalizer TR begins to step, it automatically opens break contact $T_2$, permitting contacts $L_5$ to be closed after sufficient information is obtained, thus letting the totalizer TR restore under its own control. While the totalizer TR is stepping, central office measurements can be made of its stepping rate, duty cycle and coin signal frequency if desired. To permit complete testing of this type, the totalizer TR must be capable of continuous stepping around its cam shaft.

As indicated above, a particular feature of the invention involves the combination of a vandalized set alarm with the check circuits already described. In this context a vandalized set would include a telephone set removed from the premises or otherwise disconnected from the line. Conventional vandalized set alarm circuits are dependent upon the interruption of a ripple current and accordingly provide only partial protection. Such an alarm may be avoided simply by pinning the drop wires together with a controlled resistance bridge after disconnection from the telephone. The telephone set may then be removed without detection.

A fully effective alarm circuit must instead have a two-state rather than a single-state check. In one state the set should appear as a closed circuit and in the second state it should appear as an open circuit. Additionally, the checking circuit should have the capability of shifting from one state to the other on command. It is evident that a vandal must leave the set in some static condition and hence a dynamic check of the type indicated would be able to detect the nonsatisfied condition.

The circuit in accordance with the invention shown in FIG. 1 includes all of the features outlined above that are required for a two-state dynamic alarm circuit. No additional circuit elements are required. In order to check for the first state, frequencies $f_1$ and $f_4$ are applied serially to latch contacts $L_1$ and $L_4$ respectively. With the switch hook contact $SH_1$ bypassed, the checking signal, in effect, sees a closed circuit. After the release of the L relay, a subsequent application of the checking signal should see an open circuit. Both conditions must be met to indicate the connected presence of the telephone set.

It is to be understood that the embodiment described herein is merely illustratively of the principles of the invention. Various modifications thereto may be effected by persons skilled in the art without departing from the spirit and scope of the invention.

What is claimed is:

1. In a coin telephone, apparatus for testing the operability of selected portions of said telephone comprising, in combination, a tuned reed relay including a plurality of contacts, each of said contacts being in a respective circuit with a corresponding one of said portions, each of said contacts being operatively responsive to the application of a respective interrogating signal frequency to said relay, the condition of one of said circuits after the operation of a corresponding one of said contacts being indicative of the functional state of a corresponding one of said portions, said condition being detectable from a remote point.

2. Apparatus in accordance with claim 1 wherein said portions include the coin chute, coin relay and totalizer mechanisms of said coin telephone.

3. Apparatus in accordance with claim 1 wherein each of said circuits includes means responsive to the application of a non-oscillatory signal for returning said circuits to a neutral condition.

4. In a coin telephone, apparatus for testing the operability of selected portions of said telephone comprising, in combination, means responsive to a first oscillatory signal for placing said apparatus in a ready condition, a plurality of means each responsive to an oscillatory burst of a respective frequency for testing successively each respective one of said portions, each of said portions including means responsive to a non-oscillatory signal burst for restoring said apparatus to a neutral, non-ready condition.

5. In a coin telephone, apparatus for testing the operability of selected portions of said telephone from a remote point comprising, in combination, first means responsive to an oscillatory signal of a first frequency from said point for placing said apparatus in a ready condition, a plurality of second means each responsive, after the operation of said first means, to an oscillatory signal of a respective frequency for placing each respective one of a plurality of circuits each associated with one of said portions in a ready test condition, means responsive to the application of a non-oscillatory signal of a first polarity from said remote point to said telephone for providing an indication, detectable from said remote point, of the operativeness of that one of said portions that has been placed in said ready test condition, and means responsive to the application of a non-oscillatory signal of an opposite polarity from said remote point to said telephone for restoring each of said circuits and said apparatus to a neutral or non-ready test condition.

6. Apparatus in accordance with claim 5 including means precluding said testing unless said telephone is in an on-hook condition.

7. Apparatus in accordance with claim 5 including a tuned reed relay connected in a bridging circuit across the tip and ring leads of said telephone on the loop side of the normal switch hook make contact of said telephone.

8. Apparatus in accordance with claim 5 including means responsive to the placing of said telephone in an off-hook condition for restoring any of said circuits that are in said ready test condition to a non-ready neutral condition.

9. Apparatus in accordance with claim 8 wherein said restoring means includes a switch hook break contact in said bridging circuit between said relay and said ring lead and a make contact on said relay in parallel circuit relation with said break contact between said ring lead and said bridging circuit.

10. In a coin telephone, apparatus for testing the operability of the coin chute of said telephone, said telephone including tip and ring terminal leads and a switch hook make contact in series with said ring lead, said coin chute including a plurality of plates normally insulatedly separated, alternate ones of said plates being connected, respectively, directly to said tip lead and to said ring lead by way of a resistive element and by way of a make contact of a relay, the plates of said chute being positioned so that a conductive slug or coin jammed between an adjacent pair of plates completes a path between said tip and ring leads providing said contact is closed, said relay being responsive to an interrogating signal for closing said contact, whereby the detection of current flow through said resistive element following the application of a pulse across said leads serves as an indication of a jammed coin chute.

11. Apparatus in accordance with claim 10 including means for detecting from a remote point whether the swing plate of the clear-out mechanism of said chute is jammed in an open position.

12. Apparatus in accordance with claim 10 wherein said relay comprises a tuned reed relay.

13. Apparatus in accordance with claim 12 including means for testing from a remote point the operability of the coin relay of said telephone, comprising, first and second contacts in parallel circuit combination each operatively responsive to a respective direction of operation of the coin deflecting vane of said telephone, each of said first and second contacts being in series circuit relation with a first and second resistive element, respectively, means including a reed contact of said tuned reed relay connecting the combination of said first and second contacts and said first and second resistive elements across said terminal leads, and a bridge circuit in parallel relation to said last named means, said bridge circuit including said relay and a switch hook break contact in series relation, a make contact of said tuned reed relay shunting said switch hook contact, and the parallel combination of a capacitive element and a resistive element connecting one terminal of said relay to said tip terminal lead

14. In a coin telephone set apparatus for testing from a remote point the operability of selected portions of said set comprising, in combination, a tuned reed relay including a plurality of contacts each operatively responsive to the application of a respective interrogating signal frequency to said relay, each of said contacts being in a respective circuit with a corresponding one of said portions, the conditions of one of said circuits after the operation of a corresponding one of said contacts being indicative of the functional state of a corresponding one of said portions, said condition being detectable from a remote point, the condition of a particular pair of said circuits providing means for conducting a test from a remote point to provide a positive indication as to whether said set is connected to the line.

References Cited

UNITED STATES PATENTS

| | | | |
|---|---|---|---|
| 1,795,834 | 3/1931 | Cesareo | 179—6.3 |
| 1,860,285 | 5/1932 | Gunn | 340—156 |
| 3,325,605 | 6/1967 | Brewer | 179—175.31 |

KATHLEEN H. CLAFFY, Primary Examiner

J. S. BLACK, Assistant Examiner

U.S. Cl. X.R.

179—175; 324—28